United States Patent [19]

Nomura et al.

[11] Patent Number: 4,816,499

[45] Date of Patent: Mar. 28, 1989

[54] POROUS INORGANIC PARTICLES MODIFIED WITH AMINO AND CARBOXYL GROUPS

[75] Inventors: Akira Nomura, Ibaraki; Joseph Yamada, Hoya, both of Japan

[73] Assignee: Director General of Agency of Industrial Science and Technology, Japan

[21] Appl. No.: 66,068

[22] Filed: Jun. 24, 1987

[30] Foreign Application Priority Data

Jul. 1, 1986 [JP] Japan ................................ 61-154644
Jul. 1, 1986 [JP] Japan ................................ 61-154645

[51] Int. Cl.$^4$ .............................................. C08J 9/32
[52] U.S. Cl. .................................... 523/218; 523/220;
210/263; 210/656; 210/510.1; 252/315.2;
252/315.5; 252/315.6; 252/315.7

[58] Field of Search ................ 523/218, 220; 210/656, 210/263, 510.1; 252/315.2, 315.5, 315.6, 315.7

[56] References Cited

U.S. PATENT DOCUMENTS 4,333,847 6/1982 Tran et al. .......................... 210/682
4,421,684 12/1983 Nakashima et al. ................ 210/679

Primary Examiner—John Kight
Assistant Examiner—S. A. Acquah
Attorney, Agent, or Firm—Lorusso & Loud

[57] ABSTRACT

Porous inorganic particles, such as silica gel particles, modified with amino-containing groups and carboxyl-containing groups are disclosed. The modified porous particles, useful as packing materials for column chromatography, are obtained by a method including the steps of providing porous, amino group-carrying, inorganic particles, and converting a portion of the amino groups into carboxyl-containing groups.

16 Claims, 3 Drawing Sheets

RETENTION TIME

FIG. I

RETENTION TIME

RETENTION TIME

RETENTION TIME

POROUS INORGANIC PARTICLES MODIFIED WITH AMINO AND CARBOXYL GROUPS

BACKGROUND OF THE INVENTION

This invention relates generally to porous inorganic particles useful as a packing material for column chromatography.

Because of the large surface area and high adsorption activity of porous inorganic particles such as silica gel, alumina and zeolite, they are widely used as a packing material to be packed in a gas or liquid chromatographic column. Since the adsorption activity of these inorganic particles considerably varies with their water content, however, a great care must be taken in handling them. In order to improve stability of the adsorption activity, various techniques have been developed for the modification of the porous inorganic particles.

For example, there is known silica gel whose surface is treated with octadecyltrichlorosilane (ODS) or octyltrichlorosilane for the modification with a $C_{18}$ or $C_8$ alkyl. The ODS-treated silica gel has improved stability to elution liquids such as methano-water and water-acetonitrile and is suitably used for reversed phase liquid chromatography. Silica gel whose surface is modified with an aminopropyl group, a cyanopropyl group or a diol group is also known and is commercially availble. There are, however, still numerous substances which cannot be separated in a satisfactory manner by these packing materials.

SUMMARY OF THE INVENTION

In accordance with the present invention there is provided a porous material comprising porous inorganic particles having amino-containing groups and carboxyl-containing groups each chemically bonded to the wall surfaces of the pores.

In another aspect, the present invention provides a method of preparing porous material, comprising the steps of:

(a) providing porous inorganic particles each having amino-containing groups on the wall surfaces of the pores;

(b) reacting a compound of the general formula:

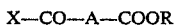

wherein X stands for a halogen, A stands for a divalent organic group and R stands for an organic group, with said porous inorganic particles to convert a portion of said amino groups into amides of the formula:

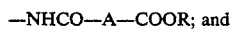

(c) subjecting the product obtained in step (b) to hydrolysis to convert the ester COOR of each of the amides to a carboxyl as follows:

As the porous material according to the present invention contains both amino and carboxyl groups, it exhibits excellent separation performace when used as packing material for, for example, liquid column chromatography for the separation of various compounds, especially zwitter-ion type compounds such as amino acids, peptides, proteins, nucleotides or the like.

It is the prime object of the present invention to provide a porous inorganic material having inside surfaces of its pores modified with amino and carboxyl groups independently of each other and useful as a packing material for column chromatography, especially liquid chromatography.

Another object of the present invention is to provide a process which can convert a portion of the amino groups bonded to inside surfaces of the pores of porous inorganic particles into carboxyl groups.

BRIEF DESCRIPTION OF THE DRAWINGS

Other objects, features and advantages of the present invention will become apparent from the detailed description of the invention which follows, when considered in the light of the accompanying drawings, in which.

DETAILED DESCRIPTION OF THE INVENTION

Figure 1:
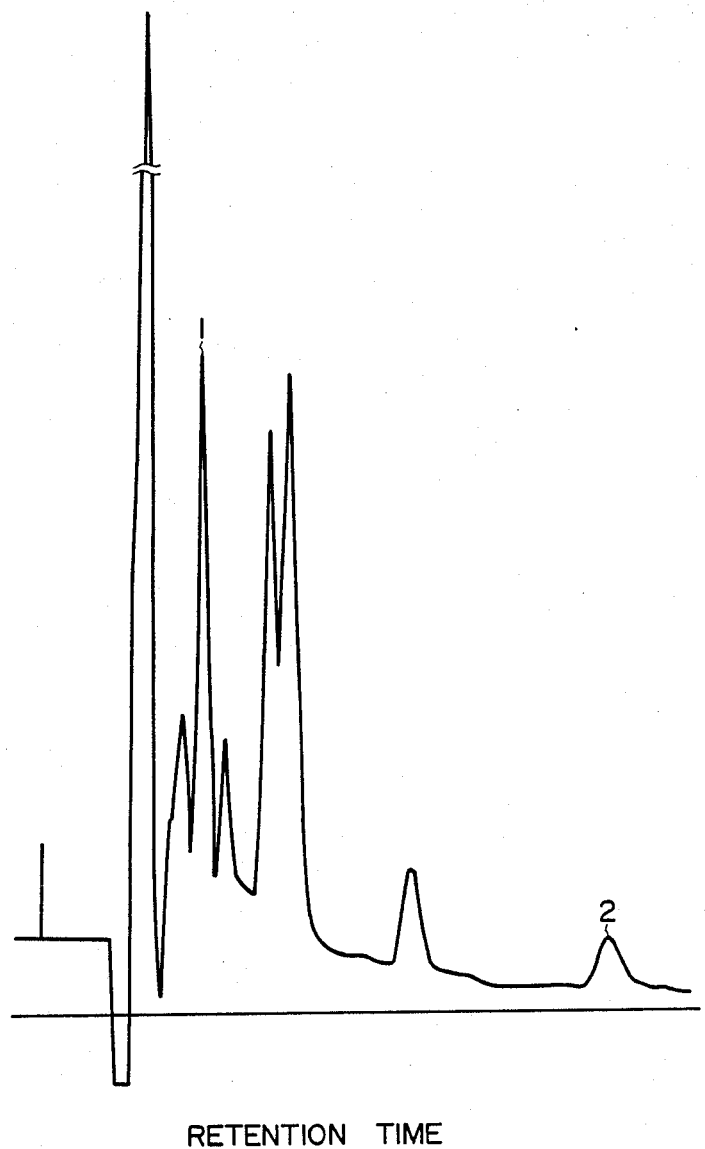
FIGS. 1 through 3 are elution patterns of human serum, peptides and proteins, respectively, on high performance liquid chromatography using modified silica gel packing materials according to the present invention.

Any porous inorganic particles may be used for the purpose of the present invention as long as they can be introduced with amino and carboxyl groups. Hydroxyl group-containing inorganic particles are preferably used. Examples of suitable porous inorganic particles to which amino-containing and carboxyl-containing groups are to be bonded include silica gel, alumina, silica-alumina, zeolite and diatomaceous earth. Above all the use of silica gel is particularly preferred when liquid chromatography is intended. The inorganic particles, when used as packing material for column chromatography, have preferably an average particle size of in the range of about 1 μm to about 5 mm, more preferably about 3 μm to 2 mm. The average pore size or diameter of the porous inorganic particles to which amino-containing and carboxyl-containing groups are to be bonded is preferably 30-5000 Å, more preferably 40 to 1000 Å.

The contents of the amino and carboxyl groups in the porous material according to the present invention are each preferably 0.01-10 millimols, more preferably 0.1 to 2 millimols per gram of the inorganic particles. The molar ratio of the carboxyl groups to the amino groups is generally 0.001 to 1000, preferably 0.02 to 50, more preferably 0.1 to 10.

In a preferred embodiment, the amino- and carboxyl-containing porous material according to the present invention may be obtained by providing porous inorganic particles having amino-containing groups on the inside surfaces of the pores, and converting a portion of the amino groups into carboxyl-containing groups.

As the porous inorganic particles having amino groups, porous inorganic particles having at least a portion of hydroxyl groups on the inside surfaces of their pores converted into amino-containing groups are preferably used. A method for the introduction of amino-containing groups into silica gel is known in the art and and such a method may be adopted in the present invention. For example, hydroxyl groups of silica gel may be converted into aminopropyl-containing groups by reaction with a silane coupling agent, e.g. by reacting silica gel with aminopropyltriethoxysilane in toluene under reflux conditions. A silane coupling agent containing 

—$(CH_2)_3NH(CH_2)NH(CH_2)NH_2$,
—$(CH_2)_3NH(CH_2)_2NH_2$ or —$CH_2NH(CH_2)_2NH_2$, for example, may be also suitably used.

The conversion of a portion of the amino groups into carboxyl groups may be performed by reacting a compound [I] of the general formula:

$$X-CO-A-COOR \quad [I]$$

wherein X stands for a halogen, A stands for a divalent organic group and R stands for an organic group, with the amino group-containing porous inorganic particles to form an amide of the formula:

$$-NHCO-A-COOR$$

and then subjecting the resultant amide to hydrolysis to convert the ester of the amide to carboxyl as follows:

$$-NHCO-A-COOH.$$

The divalent organic group A of the compound [I] may be, for example, an alkylene, alkenylene, arylene which may be substituted by one or more substituents. Illustrative of suitable divalent organic groups are ethylene, vinylene, phenylene which may be substitued by one or more substituents. The organic group R of the compound [I] may be, for example, an alkyl, alkenyl, alkynyl, cycloalkyl and aryl which may be substituted by one or more substituents. The group R preferably has 1–40 carbon atoms, more preferably 3–20 carbon atoms. The halogen group X is preferably chlorine.

The compound [I] may be obtained by, for example, the following reactions:

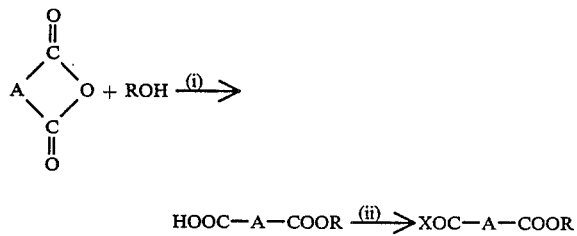

$$HOOC-A-COOR \xrightarrow{(ii)} XOC-A-COOR$$

The step (i) involves esterification of an anhydride of a dibasic acid, such as succinic anhydride, maleic anhydride or phthalic anhydride, with an alcohol. The esterification may be performed in an anhydrous inert organic solvent at a temperature of 0°–200° C., preferably at a refluxing temperature. The solvent may be, for example, an aliphatic hydrocarbon such as pentane, hexane or heptane, an alicyclic hydrocarbon such as cyclopentane or cyclohexane, a chlorinated hydrocarbon such as dichloromethane, chloroform, carbon tetrachloride, trichloroethane or chlorobenzene, or an aromatic hydrocarbon such as benzene, toluene or xylene. Above all, the use of benzene or toluene, especially toluene, is preferred. The compound [I] is used in an amount of 0.01–10 mols, preferably 0.1–5 mols, more preferably 0.5–3 mols per mole of the amino group of the porous inorganic particles.

In the step (ii), the ester group-containing carboxylic acid obtained in the step (i) is converted into an acid halide by reaction with a thionyl halide. This step may be performed in an anhydrous inert organic solvent at a temperature of 0°–200° C., preferably at a refluxing temperature. The solvent may be, for example, an aliphatic hydrocarbon such as pentane, hexane or heptane, an alicyclic hydrocarbon such as cyclopentane or cyclohexane, a chlorinated hydrocarbon such as dichloromethane, chloroform, carbon tetrachloride, trichloroethane or chlorobenzene, or an aromatic hydrocarbon such as benzene, toluene or xylene. Above all, the use of benzene or toluene, especially toluene, is preferred. The group R forming an ester serves to act as a protecting group so that the formation of diacid halide (XOC—A—COX) is prevented in step (ii).

The amide-forming reaction between the compound [I] and amino group-containing porous inorganic particles may be performed in an anhydrous inert organic solvent at a temperature of 0°–200° C., preferably at a refluxing temperature. The solvent may be, for example, an aliphatic hydrocarbon such as pentane, hexane or heptane, an alicyclic hydrocarbon such as cyclopentane or cyclohexane, a chlorinated hydrocarbon such as dichloromethane, chloroform, carbon tetrachloride, trichloroethane or chlorobenzene, or an aromatic hydrocarbon such as benzene, toluene or xylene. Above all, the use of benzene or toluene, especially toluene, is preferred. For the purpose of accelerating the amide-forming reaction, an acid binding agent such as pyridine or triethylamine may be used, if desired.

Because of the presence of a bulky group R in the compound [I], only a portion of the amine groups of the porous inorganic particles undergoes the amide-forming reaction, even if the compound [I] is used in an excess amount. That is, the bulky group R causes steric hindrance so that the molecules of the compound [I] are homogeneously bound to the amino groups at intervals.

The hydrolysis of the ester group of the thus obtained amide may be carried out in water or in an aqueous polar organic solvent, such as methanol, ethanol, propanol, isopropanol, butanol, acetone, acetonitrile or N,N-dimethylformamide, in the presence of an acid or base catalyst. While both inorganic and organic acid catalysts or base catalysts may be used, the use of an acid catalyst, especially hydrochloric acid is recommended. In a preferred embodiment, the hydrolysis is performed in water-ethanol mixed solvent containing 0.1–6 N, more preferably 0.5–3 N HCl under reflux for 10–60 minutes.

As a result of the hydrolysis of the ester groups, there is obtained the porous material of the present invention, in which both amino groups and carboxyl groups are present on the surface of the pore walls of the inorganic particles.

Since the bulky group R is already removed by the hydrolysis, a portion of the remaining amino groups may be further acylated with an acid halide such as the compound [I] or with a nitro group-containing acid halide such as p-nitrobenzoyl chloride. The nitro group of the resulting amide may be then converted into amino group by any known method.

The following examples will further illustrate the present invention.

EXAMPLE 1

Production of Aminopropyl-Containing Silica Gel

Into a 200 ml flat bottom flask equipped with a reflux condenser were placed 10 g of silica gel (SI-40, manufactured by Merck Inc; particle size: 0.063–0.200 mm; average pore diameter: 40 Å), to which 100 ml of toluene and 3.0 g of aminopropyltriethoxysilane were added. The mixture was then reacted for 1 hour under reflux with stirring by means of a magnetic stirrer. The reaction mixture was then filtered to separate the solids. The solids were washed thrice with 50 ml benzene and thrice with 50 ml dichloromethane, dried at 100° C. in a vacuum dryer overnight to obtain aminopropyl silica gel (AP-SI40) whose analytical data are as follows:

Elemental analysis: C:6.58%, H:2.47%, N:1.65% From the results of the analysis, the content of the aminopropyl group is calculated as 1.18 millimols per gram of AP-SI40.

The above procedure was repeated using different silica gel (SI-60, manufactured by Merck Inc; particle size: 0.063–0.200 mm; average pore diameter: 60 Å) to obtain aminopropyl silica gel (AP-SI60) containing 1.09 millimols of aminopropyl group per gram of AP-SI60.

Elemental analysis: C:5.50%, H:1.18%, N:1.53%

The above procedure was repeated using different silica gel (SI-100 manufactured by Merck Inc; particle size: 0.063–0.200 mm; average pore diameter: 100 Å) to obtain aminopropyl silica gel (AP-SI100) containing 0.80 millimols of aminopropyl group per gram of AP-SI100.

Elemental analysis: C:4.07%, H:1.27%, N:1.12%

Preparation of Acylating Agent (Compound [I])

Into an eggplant type flask equipped with a reflux condenser were charged 5.0 g (0.05 mol) of succinic anhydride and 7.91 g (0.05 mol) of n-decanol, to which was added 200 ml of toluene. The mixture was then reacted for 3 hours under reflux conditions. A portion of the reaction mixture was sampled and analysed, for detection of unreacted succinic anhydride, by high performance liquid chromatography using an ODS-silica gel column and an acetonitrile-water (1:1) elution liquid. Almost no unreacted succinic anhydride was detected, indicating that the reaction proceeded quantitatively. An NMR spectroscopy revealed a peak responsible for a carboxyl group at near 11.3 ppm on the basis of the TMS peak. After the remainder of the reaction mixture in the flask had been cooled, about 4 equivalents (about 14.5 ml) of thionyl chlide were added into the flask and the mixture heated for two hours under reflux conditions. Then the solvent was removed by means of a rotary evaporator. The residue was dissolved in 100 ml benzene and the solvent was again removed by means of the evaporator. This procedure was repeated once more and the resulting residue was dried at 80° C. in vacuum to obtain a product E₁ From the NMR spectroscopic analysis, the product E₁ is identified as n-decyl chlorocarbonylpropionate of the formula:

C₁₀H₂₁OOCC₂H₄COCl

The above procedure was repeated in the same manner as described except that n-decanol was replaced by 10.72 g (0.05 mol) of n-tetradecanol to obtain a product E₂ which was identified as n-tetradecyl chlorocarbonylpripionate of the formula:

C₁₄H₂₉OOCC₂H₄COCl

The above procedure was repeated in the same manner as described except that n-decanol was replaced by 13.52 g (0.05 mol) of n-octadecanol to obtain a product E₃ which was identified as n-octadecyl chlorocarbonylpripionate of the formula:

C₁₈H₃₇OOCC₂H₄COCl

Acylation of Aminopropyl Silica Gel

The chlorocarbonylpropionate E₁ obtained above was dissolved in toluene to obtain a solution having a concentration of 0.25 millimol/ml. This solution (25 ml) was further diluted with 25 ml of toluene, to which 5.0 g of aminopropyl silica gel AP-SI40 obtained above were added. The mixture was then reacted for 1 hour under reflux conditions with stirring. After the reaction was completed, the reaction mixture was cooled and filtered and the solids (silica gel) were washed thrice with 50 ml of benzene and thrice with 50 ml of dichloromethane. The washed product was then dried at 100° C. overnight in vacuum. The elemental analysis of the resulting silica gel (E₁-AP-SI40) revealed that the compound E₁ was bound to the silica gel in an amount of 0.47 mol per 1 mol of the aminopropyl group of the aminopropyl silica gel AP-SI40.

The above procedure was repeated in the same manner as described except that the compound E₂ was substituted for the compound E₁. The elemental analysis of the resulting silica gel (E₂-AP-SI40) revealed that the compound E₂ was bound to the silica gel in an amount of 0.42 mol per 1 mol of the aminopropyl group of the aminopropyl silica gel AP-SI40.

The above procedure was repeated in the same manner as described except that the compound E₃ was substituted for the compound E₁. The elemental analysis of the resulting silica gel (E₃-AP-SI40) revealed that the compound E₃ was bound to the silica gel in an amount of 0.34 mol per 1 mol of the aminopropyl group of the aminopropyl silica gel AP-SI40.

Using the aminopropyl silica gel AP-SI60 in lieu of AP-SI40, the above procedure was repeated for acylation with the compounds E₁, E₂ and E₃ in the same manner as above. The elemental analysis of the resulting silica gel (E₁-AP-SI60, E₂-AP-SI60 and E₃-AP-SI60) revealed that the compounds E₁, E₂ and E₃ were bound to the silica gel AP-SI60 in amounts of 0.57, 0.49 and 0.49 mol per 1 mol of the aminopropyl group of the aminopropyl silica gel AP-SI60, repsectively.

Using the aminopropyl silica gel AP-SI100 in lieu of AP-SI40, the above procedure was repeated for acylation with the compounds E₁, E₂ and E₃ in the same manner as above. The elementary analysis of the resulting silica gel (E₁-AP-SI100, E₂-AP-SI100 and E₃-AP-SI100) revealed that the compounds E₁, E₂ and E₃ were bound to the silica gel AP-SI100 in amounts of 0.68, 0.60 and 0.60 mol per 1 mol of the aminopropyl group of the aminopropyl silica gel AP-SI100, repsectively.

The above results indicate that the smaller the pore diameter and the larger the size of the ester group of the chlorocarbonylpropionate, the greater becomes the degree of steric hindrance and the smaller becomes the amount of the chlorocarbonylpropionate bound to the aminopropyl silica gel.

Hydrolysis

The silica gel E₂-AP-SI40 (3.0 g) was added into 30 ml of 2N hydrochloric acid solution (water:ethanol=1:1) and the mixture was stirred under reflux conditions to hydrolyze the ester group of the silica gel. After the hydrolysis, the reaction mixture was cooled and the silica gel was separated by filtration and washed thrice with 50 ml of 1:1 water-methanol and thrice with 50 ml water. The washed silica gel was dried at 100° C. overnight in vacuum. The elemental analysis of dried silica gel (COOH-$E_2$-AP-SI40) revealed that carbon atoms were lost in a number of 14.2 per one molecule of the compound $E_2$ bound to the silica gel with the content of nitrogen remaining unchanged. Thus, it was confirmed that all of the ester groups contained in the silica gel $E_2$-AP-SI40 were hydrolyzed to carboxyl groups with the simultaneous liberation of $C_{14}$ alcohol. The presence of the carboxyl groups in the product is also confirmed by IR spectrum (absorption at ca. 1700cm$^{-1}$).

The above procedure was repeated in the same manner as above using $E_2$-AP-SI60 in lieu of $E_2$-AP-SI40. The elemental analysis of the thus obtained silica gel (COOH-$E_2$-AP-SI60) revealed that carbon atoms were lost in a number of 13.7 per one molecule of the compound $E_2$ bound to the silica gel with the content of nitrogen remaining unchanged. Thus, it was confirmed that all of the ester groups contained in the silica gel $E_2$-AP-SI60 were hydrolyzed to carboxyl groups with the simultaneous liberation of $C_{14}$ alcohol. The presence of the carboxyl groups in the product is also confirmed by IR spectrum.

The above procedure was repeated in the same manner as above using $E_2$-AP-SI100 in lieu of $E_2$-AP-SI40. The elemental analysis of the thus obtained silica gel (COOH-$E_2$-AP-SI100) revealed that carbon atoms were lost in a number of 14.4 per one molecule of the compound $E_2$ bound to the silica gel with the content of nitrogen remaining unchanged. Thus, it was confirmed that all of the ester groups contained in the silica gel $E_2$-AP-SI100 were hydrolyzed to carboxyl groups with the simultaneous liberation of $C_{14}$ alcohol. The presence of the carboxyl groups in the product is also confirmed by IR spectrum.

In the same manner as described above, the estercontaining silica gel $E_1$-AP-SI40, $E_1$-AP-SI60, $E_1$-AP-SI100, $E_3$-AP-SI40, $E_3$-AP-SI60 and $E_3$-AP-SI100 were subjected to hydrolysis to obtain carboxyl group-containing silica gel COOH-$E_1$-AP-SI40, COOH-$E_1$-AP-SI60, COOH-$E_1$-AP-SI100, COOH-$E_3$-AP-SI40, COOH-$E_3$-AP-SI60 and COOH-$E_3$-AP-SI100.

EXAMPLE 2

Example 1 was repeated in the same manner as described using $E_2$ as acylating agent and silica gel LiChrosorb SI-60 (manufactured by Merck Inc.; average particle size 10 μm; average pore diameter 60 Å) as starting material, thereby to obtain amino- and carboxyl-containing silica gel COOH-$E_2$-AP-LiChSI60. Elemental analysis reveals that the amounts of $NH_2$ and COOH in the amino- and carboxyl-containing silica gel COOH-$E_2$-AP-LiChSI60 are 0.52 millimol and 0.48 millimol per 1 g of the silica gel, respectively.

EXAMPLE 3

Example 1 was repeated in the same manner as described using $E_2$ as acylating agent and silica gel LiChrosorb SI-100 (manufactured by Merck Inc.; average particle size 10 um; average pore diameter 100 Å) as starting material, thereby to obtain amino- and carboxyl-containing silica gel COOH-$E_2$-AP-LiChSI100. Elemental analysis reveals that the amounts of $NH_2$ and COOH in the amino- and carboxyl-containing silica gel COOH-$E_2$-AP-LiChSI100 are 0.35 millimol and 0.46 millimol per 1 g of the silica gel, respectively.

EXAMPLE 4

Example 1 was repeated in the same manner as described using $E_2$ as acylating agent and silica gel LiChrosorb SI-300 (manufactured by Merck Inc.; average particle size 10 μm; average pore diameter 300 Å) as starting material, thereby to obtain amino- and carboxyl-containing silica gel COOH-$E_2$-AP-LiChSI300. Elemental analysis reveals that the amounts of $NH_2$ and COOH in the amino- and carboxyl-containing silica gel COOH-$E_2$-AP-LiChSI300 are 0.31 millimol and 0.36 millimol per 1 g of the silica gel, respectively.

EXAMPLE 5

The amino- and carboxyl-containing silica gel COOH-$E_2$-AP-SI60 (3.0 g) obtained in Example 1 was added to 50 ml of toluene, to which p-nitrobenzoyl chloride was added in an amount of 2.5 millimols per 1 g of the silica gel. The mixture was reacted for 1 hour with stirring under reflux conditions. After the reaction, the reaction mixture was cooled to room temperature and the silica gel was separated by filtration and washed thrice with benzene and thrice with dichloromethane. The washed product was dried at 100° C. overnight in vacuum. The acylated product was found to contain 0.26 millimol of p-nitrobenzoyl group per 1 g of the silica gel COOH-$E_2$-AP-SI40. The acylated product (2.0 g) was then mixed with 20 ml of 10% stannous chloride and 5 ml of concentrated hydrochloric acid and the mixture was stirred at room temperature for 2 hours for the reduction of the nitro group into amino group. About 80% of the nitro groups were found to be converted into amino groups. The product is referred to as COOH-$E_2$-$NH_2$-Benzoyl-AP-SI40.

The above procedure was repeated in the same manner as described using COOH-$E_2$-AP-SI60 in lieu of COOH-$E_2$-AP-SI40, thereby to obtain anamino- and carboxyl-containing silica gel COOH-$E_2$-$NH_2$-Benzoyl-AP-SI60. The acylated product was found to contain 0.23 millimol of p-nitrobenzoyl group per 1 g of the silica gel COOH-$E_2$-AP-SI60 and about 80% of the nitro groups thereof were found to be converted into amino groups.

The above procedure was repeated in the same manner as described using COOH-$E_2$-AP-SI100 in lieu of COOH-$E_2$-AP-SI40, thereby to obtain anamino- and carboxyl-containing silica gel COOH-$E_2$-$NH_2$-Benzoyl-AP-SI100. The acylated product was found to contain 0.21 millimol of p-nitrobenzoyl group per 1 g of the silica gel COOH-$E_2$-AP-SI100 and about 80% of the nitro groups thereof were found to be converted into amino groups.

EXAMPLE 6

Example 1 was repeated in the same manner as described using $E_2$ as acylating agent and alumina for chromatography (manufactured by Merck Inc.; particle size 0.063–0.2 mm; average pore diameter 90 Å; neutral) as starting material inorganic particles, thereby to obtain amino- and carboxyl-containing alumina COOH-$E_2$-AP-alumina. Elemental analysis reveals that an aminopropyl group is incorporated into the alumina in an amount of 0.43 millimol per 1 g of the alumina and the acylating agent $E_2$ is incorporated into the alumina in an amount of 0.47 mol per mol of the amino group.

EXAMPLE 7

The amino- and carboxyl-containing silica gel COOH-E$_2$-AP-LiChSI60 obtained in Example 2 was packed in 4 mm (inner diameter)×250 mm stainless steel column on which a deproteinized human serum was applied. High performance liquid chromatography was performed with an acetonitrile:water (80:20) eluent adjusted to pH 6.0 with a phosphate buffer. The elution pattern is shown in FIG. 1 in which the peaks 1 and 2 are for creatinine and creatine, respectively.

EXAMPLE 8

Figure 2:
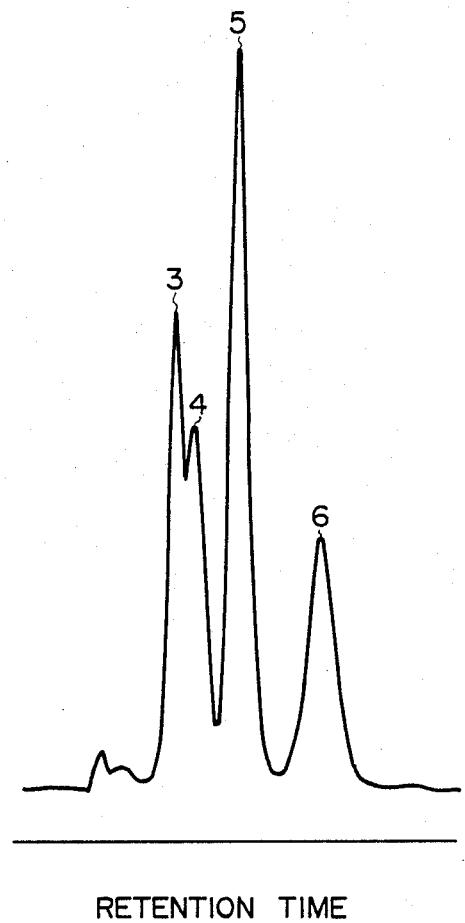

The amino- and carboxyl-containing silica gel COOH-E$_2$-AP-LiChSI100 obtained in Example 3 was packed in 4 mm (inner diameter)×150 mm stainless steel column on which a mixture of 4 kinds of peptides angiotensin II (Asp-Arg-Val-Tyr-Ile-His-Pro-Phe), angiotensin I (Asp-Arg-Val-Tyr-Ile-His-Pro-Phe-His-Leu), angiotensin III (Arg-Val-Tyr-Ile-His-Pro-Phe) and bradykinin (Arg-Pro-Pro-Gly-Phe-Ser-Pro-Arg) was applied. High performance liquid chromatography was performed at an elution rate of 1 ml/min with an acetonitrile:water (65:35) eluent adjusted to pH 5.30 with a phosphate buffer. The elution pattern is shown in FIG. 2 in which the peaks 3 through 6 are for angiotensin II, angiotensin I, angiotensin III and bradykinin, respectively.

EXAMPLE 9

Figure 3:
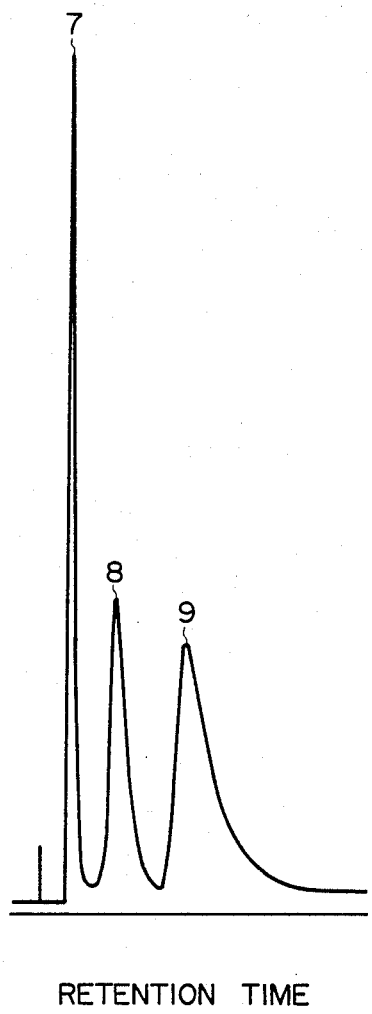

The amino- and carboxyl-containing silica gel COOH-E$_2$-AP-LiChSI300 obtained in Example 4 was packed in 4 mm (inner diameter)×150 mm stainless steel column on which a mixture of 3 kinds of proteins cytochrome C, alpha-chymotrypsinogen A and lysozyme was applied. High performance liquid chromatography was performed at an elution rate of 1 ml/min using a 0.2 M phosphate buffer (pH 5.89) as eluent. The elution pattern (monitored at wave length of 254 nm) is shown in FIG. 3 in which the peaks 7 through 9 are attributed to cytochrome C, alphachymotrypsinogen A and lysozyme, respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A porous material comprising porous inorganic particles having amino-containing groups and carboxyl-containing groups, each chemically bonded to the wall surfaces of the pore, wherein the contents of the amino-containing groups and carboxyl-containing groups are each 0.01 to 10 millimols per gram of the inorganic particles.

2. A porous material according to claim 1, wherein said inorganic particles have an average pore diameter in the range of 30 to 5000 Å.

3. A porous material according to claim 2, wherein said inorganic particles have an average particle size in the range of 1 μm to 5 mm.

4. A porous material according to claim 3, wherein said inorganic particles are silica gel, alumina, silica-alumina, zeolite or diatomaceous earth.

5. A porous material according to claim 4, wherein said inorganic particles are silica gel particles.

6. A porous material according to claim 1, wherein the contents of the amino-containing groups and carboxyl-containing groups are each 0.1–2 millimols per gram of the inorganic particles.

7. A porous material according to claim 6, wherein the molar ratio of the amino groups to the carboxyl groups is in the range of 0.1 to 10.

8. A porous material according to claim 1, wherein the amino-containing groups is —B—NH$_2$ and the carboxyl-containing group is —B—NHCO—A—COOH and wherein B is —(CH$_2$)$_3$NH$_2$, —(CH$_2$)$_3$NH-COC$_6$H$_4$NH$_2$, —(CH$_2$)$_3$NH(CH$_2$)NH(CH$_2$)NH$_2$, —(CH$_2$)$_3$NH(CH$_2$)$_2$NH$_2$ or —CH$_2$NH(CH$_2$)$_2$NH$_2$.

9. A method of preparing porous material, comprising the steps of:
 (a) providing porous inorganic particles each having amino-containing groups on the wall surfaces of the pores;
 (b) reacting a compound of the general formula:

X—CO—A—COOR

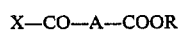

wherein X stands for a halogen, A stands for a divalent organic group and R stands for an organic group, with said porous inorganic particles to convert a portion of said amino groups into amides of the formula:

—NHCO—A—COOR; and

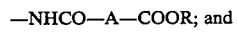

(c) subjecting the product obtained in step (b) to hydrolysis to convert the ester COOR of each of the amides to a carboxyl as follows:

—NHCO—A—COOH.

10. A method according to claim 9, wherein said divalent organic group represented by A is selected from alkylene, alkenylene and arylene groups which may be substituted by one or more substitutents.

11. A method according to claim 9, wherein said organic group represented by R is selected from alkyl, alkenyl, alkynyl, cycloalkyl or aryl groups which may be substituted by one or more substituents.

12. A method according to claim 9, wherein the amino-containing group is —B—NH$_2$ and the carboxyl-containing group is —B—NHCO—A—COOH and wherein B is —(CH$_2$—(CH$_2$)$_3$NH(CH$_2$)NH(CH$_2$)NH$_2$, —(CH$_2$)$_3$NH(CH$_2$)$_2$NH$_2$ or —CH$_2$NH(CH$_2$)$_2$NH$_2$.

13. Porous particles obtained by a method according to claim 9.

14. The porous material of claim 1 wherein said amino-containing groups and said carboxyl-containing groups are homogeneously bound at intervals on said wall surfaces.

15. The method of claim 11 wherein R has 3–20 carbon atoms.

16. The process of claim 9 wherein R provides steric hindrance so that X—CO—A—COOR reacts homogeneously with said amino-containing groups at intervals.

* * * * *

UNITED STATES PATENT AND TRADEMARK OFFICE
CERTIFICATE OF CORRECTION

PATENT NO. : 4,816,499
DATED : March 28, 1989
INVENTOR(S) : NOMURA et al

It is certified that error appears in the above-identified patent and that said Letters Patent is hereby corrected as shown below:

Column 5, line 49, after "$E_1$" insert a period --.--;

line 54, "$C_{10}H_2OOCC_2H_4COCl$" should read --$C_{10}H_{21}OOCC_2H_4COCl$--.

Signed and Sealed this

Ninth Day of January, 1990

Attest:

JEFFREY M. SAMUELS

Attesting Officer     Acting Commissioner of Patents and Trademarks